Patented Dec. 12, 1933

1,939,212

UNITED STATES PATENT OFFICE 1,939,212

PRODUCTION OF MONOCARBOXYLIC ACIDS

Alphons O. Jaeger, Mount Lebanon, Pa., assignor to The Selden Company, Pittsburgh, Pa., a corporation of Delaware No Drawing. Application March 28, 1931
Serial No. 526,119

8 Claims. (Cl. 260—108)

This invention relates to the production of monocarboxylic acids and their salts and derivatives by splitting off carboxyl groups from the corresponding polycarboxylic acid compounds.

In my prior application Serial No. 359,722, filed May 1, 1929, a process has been described in which monocarboxylic acids are produced by heating salts of polycarboxylic acids, such as zinc phthalate and the like, in an atmosphere of steam or hydrogen, the zinc phthalate being broken up into benzoic acid or benzaldehyde, carbon dioxide, and zinc oxide. This process ordinarily requires special apparatus, such as will maintain a positive control of the temperature and requires that the zinc oxide or other metal oxide be reacted with phthalic acid to produce the phthalate before the process can be carried out.

I have now found that a great simplification of this process can be effected by charging a mixture of the wet polycarboxylic acid substance and the metal oxide into a heating chamber without first reacting them, subsequent heating of the charge being sufficient to produce the monocarboxylic acid substance without first forming the metal salt. This process does not require definite temperature control, as heating of the charge at temperatures of 300–450° C. suffices to complete the reaction and there is no tendency for undesired products to form if the temperature is not closely regulated.

A further advantage of the present invention lies in the fact that the metal oxide does not have to be proportioned stoichiometrically to the polycarboxylic acid substance, as is the case when it is first reacted to form a metal salt, but on the contrary, greater or lesser amounts than those required by theory can be used if desired. The present process is applicable to polycarboxylic acids generally, such substances as phthalic acid, naphthalic acid, diphenic acid, maleic acid, fumaric acid, succinic acid, adipic acid and the like being suitable examples, and it is to be understood that substituted products, such as the nitro, halogen, amino and sulfo substituted acids may be reacted in similar manner and are included in the invention. The invention also includes the use of hydrogen, carbon monoxide, and other reducing gases if desired, as well as the use of steam in addition to that formed from the wet polycarboxylic acid.

While the present invention may be applied to polycarboxylic acids generally, and particularly to those of the types enumerated above, the application of the process which appears to be most attractive commercially at present is in the utilization of by-products obtained in the catalytic oxidation of aromatic hydrocarbons to acids, such as the catalytic production of phthalic anhydride from naphthalene, maleic acid from benzol and the like. In such processes, and particularly in the catalytic oxidation of naphthalene, by-products such as maleic acid, fumaric acid and the like are produced and must be collected in fume towers. Similarly, considerable proportions of uncondensed phthalic anhydride are recovered in these towers as phthalic acid, and require expensive treatment to produce a product of commercial purity.

Such by-products, and particularly phthalic acid, condense out at the bottoms of the fume towers, and require extra work and acid resistant equipment to dissolve them again if the metal salt is to be reacted as in my prior application above referred to, but in accordance with the present invention this wet mass is simply admixed with the theoretical amount of metal oxides, such as those of zinc, copper, nickel, iron, cobalt, cadmium, etc. to form the normal salt and charged into an autoclave, or considerably greater or less than theoretical amounts of metal oxide may be used if desired. The metal oxide is recovered from the autoclave at the end of the process and admixed with a new batch of the dicarboxylic acid, and consequently the economy resulting from the use of less than theoretical amount is not a great one, and is usually offset by the slower reaction which results. In any case, however, no exact quantitative proportions need be maintained, and this freedom from close proportioning is an advantage of the process in any event.

The reaction is preferably carried on in autoclaves or other pressure cookers, since the reaction temperature is considerably above the boiling point of water. Ordinarily the water present in the wet phthalic acid, both as free $H_2O$ and as that combined with the anhydride of the polycarboxylic acid will be sufficient to form a protecting atmosphere and inhibit undesired side reactions but additional steam, with or without the addition of hydrogen, CO or other reducing gases, may be added to the reaction if desired. The monocarboxylic acid produced vaporizes in the presence of steam, and a considerable proportion of it can be blown into condensers when the pressure on the autoclave is released at the end of the reaction. It is also possible, of course, to maintain a continuous flow of steam through the autoclave in which case the monocarboxylic acid is recovered as fast as it is produced, but in any case it is usually desirable to exhaust the mass remaining in the autoclave with steam in order to recover the last traces of the monocarboxylic acid produced. Similar results may be obtained with solvents for the acid, or by other means which will readily occur to those skilled in the art.

The present process has been more particularly described in conjunction with by-products from the catalytic oxidation of organic compounds, but it should be understood that the invention is not limited to the use of by-products as raw materials. On the contrary, pure materials may be used if desired, for example phthalic acid produced from pure catalytic phthalic anhydride by such processes as those described in the prior application of Jaeger and Daniels, Serial No. 510,767, filed January 23, 1931. Similarly, other pure polycarboxylic acid substances may be used, and where the substance is ordinarily obtained commercially in the form of its anhydride, this may be first charged into the autoclave and reacted with insufficient amounts of water to produce a solution of the acid, or with steam, in the manner described in that application.

The invention will be described in connection with the following specific examples which illustrate a few typical embodiments thereof.

Example 1

Wet phthalic acid, together with a slight excess over the theoretical amount of ZnO to produce zinc phthalate is charged into an autoclave and heated to 300°–420° C. At these temperatures vapors of benzoic acid are present in large quantities within the autoclave.

Heating is continued until the reaction is complete, after which the autoclave is blown down into a condenser and the remaining benzoic acid distilled out with steam or extracted with solvents.

Instead of retaining the benzoic acid vapors first formed within the autoclave, they may be discharged from time to time during the heating, fresh steam being added under pressure if desired. Similarly a continuous flow of steam may be maintained, thus removing the benzoic acid continuously.

Example 2

Phthalic acid can also be converted into benzoic by the use of smaller amounts of zinc oxide than that required to produce the normal phthalate. A charge of wet phthalic acid, admixed with about half the zinc oxide required by theory, is heated under pressure in an atmosphere of hydrogen at temperatures up to 350–360° C. for 1½ hours, after which the reaction is completed. The mass is exhausted of benzoic acid by steam and the residue is again used with more phthalic acid.

Example 3

Copper oxide is admixed with wet phthalic acid as in Example 1 and heated to 300–350° C. Good yields of benzoic acid are obtained, the residue in the autoclave being steam distilled and reused.

What is claimed as new is:

1. A method of transforming dicarboxylic acids into compounds containing only a single CO group, which comprises heating the wet dicarboxylic acid with an oxide of a non-alkali forming metal at temperatures of 325–450° C.

2. A method of transforming dicarboxylic acids into compounds containing only a single CO group, which comprises heating the wet dicarboxylic acid with an oxide of a non-alkali forming metal at temperatures of 325–450° C. in such a manner that steam produced is retained within the sphere of the reaction.

3. A method of transforming dicarboxylic acids into compounds containing only a single CO group, which comprises heating the wet dicarboxylic acid with an oxide of a non-alkali forming metal at temperatures of 325–450° C. in the presence of a protecting atmosphere containing a reducing gas.

4. A method according to claim 1, in which the metal oxide is zinc oxide.

5. A method of transforming phthalic acid into oxomethyl benzene compounds, which comprises heating wet phthalic acid in admixture with a non-alkali forming metal oxide to temperatures of 325–450° C.

6. A method of transforming phthalic acid into oxomethyl benzene compounds, which comprises heating wet phthalic acid in admixture with a non-alkali forming metal oxide to temperatures of 325–450° C. in such a manner that steam produced is retained within the sphere of the reaction.

7. A method of transforming phthalic acid into oxomethyl benzene compounds, which comprises heating wet phthalic acid, in admixture with a non-alkali forming metal oxide to temperatures of 325–450° C. in the presence of a protecting atmosphere containing a reducing gas.

8. A method of producing benzoic acid, which comprises admixing wet phthalic acid with zinc oxide, heating the mixture in an autoclave at temperatures of 325–450° C., and distilling off the benzoic acid with steam.

ALPHONS O. JAEGER.